US012641533B2

(12) United States Patent
Chen et al.

(10) Patent No.: US 12,641,533 B2
(45) Date of Patent: May 26, 2026

(54) MOBILE NETWORK SELECTION METHOD AND APPARATUS, MOBILE USER EQUIPMENT, AND STORAGE MEDIUM

(71) Applicants: China Mobile Communication Co., Ltd Research Institute, Beijing (CN); China Mobile Communications Group Co., Ltd., Beijing (CN)

(72) Inventors: Xu Chen, Beijing (CN); Yi Jiang, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 257 days.

(21) Appl. No.: 18/249,592

(22) PCT Filed: Nov. 5, 2021

(86) PCT No.: PCT/CN2021/129026
§ 371 (c)(1),
(2) Date: Apr. 20, 2023

(87) PCT Pub. No.: WO2022/095967
PCT Pub. Date: May 12, 2022

(65) Prior Publication Data
US 2023/0397099 A1      Dec. 7, 2023

(30) Foreign Application Priority Data
Nov. 6, 2020     (CN) .......................... 202011228741.7

(51) Int. Cl.
*H04W 48/20*      (2009.01)
*H04W 48/10*      (2009.01)
*H04W 84/04*      (2009.01)

(52) U.S. Cl.
CPC ........... *H04W 48/20* (2013.01); *H04W 48/10* (2013.01); *H04W 84/042* (2013.01)

(58) Field of Classification Search
CPC ... H04W 48/20; H04W 48/10; H04W 84/042; H04W 8/183; H04W 48/18; H04W 84/105; H04W 48/02
See application file for complete search history.

(56) References Cited

U.S. PATENT DOCUMENTS

| | | | |
|---|---|---|---|
| 11,570,704 B2 * | 1/2023 | Won | H04W 60/00 |
| 2020/0351755 A1 * | 11/2020 | Huang-Fu | H04W 8/186 |
| 2023/0019791 A1 * | 1/2023 | Chen | H04W 36/0016 |

FOREIGN PATENT DOCUMENTS

WO      2020140830 A1      7/2020

OTHER PUBLICATIONS

China Mobile, Discussion paper on the solutions for the UE without the "CAG information list" to access CAG cells of the HPLMN in the automatic selection mode, 3GPP TSG CT WG1 Meeting #126-e, C1-206129, Oct. 15-26, 2020 Electronic Meeting.
(Continued)

*Primary Examiner* — Joshua L Schwartz
(74) *Attorney, Agent, or Firm* — Price Heneveld LLP

(57)      ABSTRACT
A mobile network selection method, device, mobile user equipment and a storage medium are provided. The method includes when a mobile user equipment supporting a Closed Access Group CAG function automatically selects a mobile network, determining, by a Non-Access Stratum NAS function of the mobile user equipment according to information in a Universal Subscriber Identity Module USIM of the mobile user equipment, whether to allow the mobile user equipment to access a CAG cell of a Public Land Mobile Network PLMN; when the mobile user equipment receives a broadcast message of a CAG cell and the mobile user equipment is allowed to access the CAG cell of the PLMN,
(Continued)

When a mobile user equipment supporting a CAG function automatically selects a mobile network, determining, by a NAS function of the mobile user equipment, whether to allow the mobile user equipment to access a CAG cell of a PLMN according to information in a USIM of the mobile user equipment

— 101

When the mobile user equipment receives a broadcast message of a CAG cell and the mobile user equipment is allowed to access the CAG cell of the PLMN, selecting, by the NAS function, a mobile network corresponding to a PLMN identifier indicated in the broadcast message of the CAG cell

— 102 selecting, by the NAS function, a mobile network corresponding to a PLMN identifier indicated in the broadcast message of the CAG cell.

15 Claims, 1 Drawing Sheet

(56)                    References Cited

OTHER PUBLICATIONS

Huawei, HiSilicon, Discussion on the selection between PLMN and PNI-NPN, 3GPP TSG-RAN WG2 #112-e R2-2010356, Nov. 2-13, 2020, Online.
China Mobile, The requirement for UE supporting CAG but without "CAG information list" in automatic network selection mode, 3GPP TSG-CT WG1 Meeting #125-e, C1-205475, Aug. 20-28, 2020, Electronic meeting.
China Mobile, The requirement of the CAG access mode for the UE supporting CAG, 3GPP TSG-CT WG1 Meeting #126-e, C1-206130, Oct. 15-23, 2020, Electronic meeting.
China Mobile, China Unicom, China Telecom, Mediatek Inc, The requirement for UE without "CAG information list" in automatic network selection mode, 3GPP TSG-CT WG1 Meeting #127-e, C1-207118, Nov. 13-20, 2020, Electronic meeting.

* cited by examiner

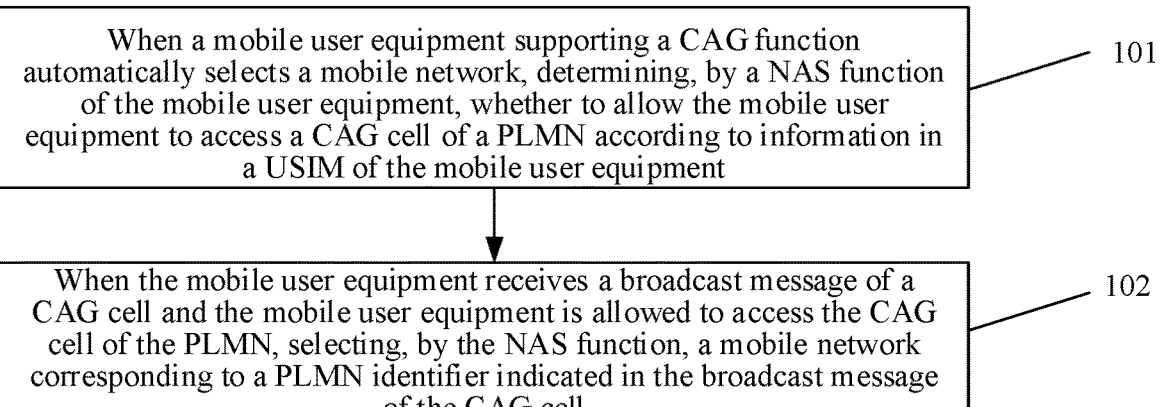

When a mobile user equipment supporting a CAG function automatically selects a mobile network, determining, by a NAS function of the mobile user equipment, whether to allow the mobile user equipment to access a CAG cell of a PLMN according to information in a USIM of the mobile user equipment — 101

When the mobile user equipment receives a broadcast message of a CAG cell and the mobile user equipment is allowed to access the CAG cell of the PLMN, selecting, by the NAS function, a mobile network corresponding to a PLMN identifier indicated in the broadcast message of the CAG cell — 102

Fig. 1

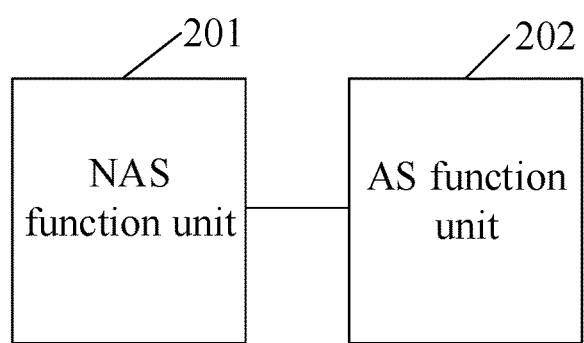

201

202

NAS function unit

AS function unit

Fig. 2

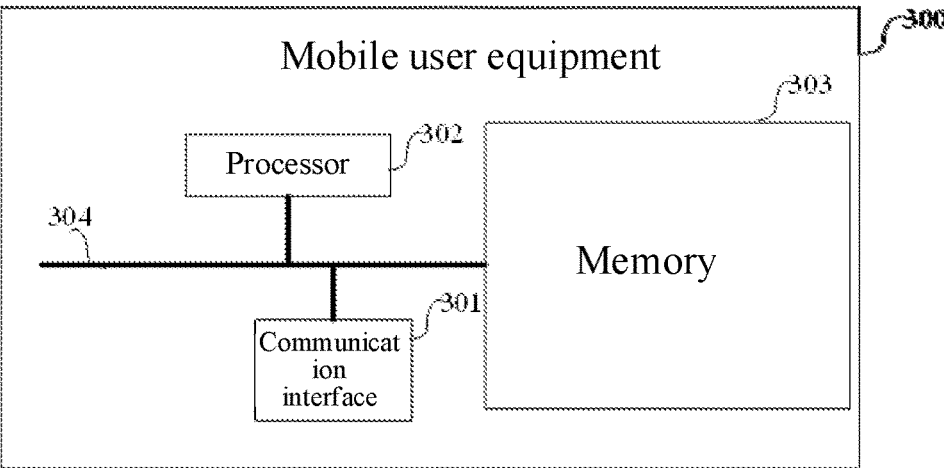

Mobile user equipment    300

Processor    302

Memory    303

304

Communication interface    301

Fig. 3

MOBILE NETWORK SELECTION METHOD AND APPARATUS, MOBILE USER EQUIPMENT, AND STORAGE MEDIUM

CROSS-REFERENCE TO RELATED APPLICATION

This application is a U.S. national phase application of a PCT Application No. PCT/CN2021/129026 filed on Nov. 5, 2021, which is filed based on and claims a priority to Chinese Patent Application No. 202011228741.7 filed on Nov. 6, 2020, the disclosures of which are incorporated in their entirety by reference herein.

TECHNICAL FIELD

The present disclosure relates to the field of communications techniques, in particular, relates to a mobile network selection method, a mobile network selection device, a mobile user equipment, and a storage medium.

BACKGROUND

When deploying a Non-Public Network (NPN) to vertical industry customers through a fifth generation (5G) mobile communication technology network, there are two deployment modes. That is, the NPN includes two types, one type is a standalone networking NPN, i.e., Stand-alone NPN (SNPN), the other type is a non-standalone networking NPN, i.e., Public Network Integrated-NPN (PNI-NPN). The PNI-NPN implements isolation between different NPNs based on slicing technology and Closed Access Group (CAG) technology of a public network.

The CAG technology is applied in a network selection stage of a terminal, and is used to prevent access of non-NPN users or non-home-NPN users. However, in the related art, a terminal supporting a CAG function may not be able to access an NPN network while in a service area of the NPN network.

SUMMARY

In order to solve technical problems in the related art, embodiments of the present application provide a mobile network selection method, a mobile network selection device, a mobile user equipment and a storage medium.

The technical solutions of the embodiments of the present application are realized as follows:

A mobile network selection method provided in the embodiments of the present application includes: when a mobile user equipment supporting a Closed Access Group (CAG) function automatically selects a mobile network, determining, by a Non-Access Stratum (NAS) function of the mobile user equipment according to information in a Universal Subscriber Identity Module (USIM) of the mobile user equipment, whether to allow the mobile user equipment to access a CAG cell of a Public Land Mobile Network (PLMN); when the mobile user equipment receives a broadcast message of a CAG cell and the mobile user equipment is allowed to access the CAG cell of the PLMN, selecting, by the NAS function, a mobile network corresponding to a PLMN identifier indicated in the broadcast message of the CAG cell.

In the above technical solution, the method further includes reading the information from the USIM by the NAS function when there is no CAG information on the mobile user equipment.

In the above technical solution, determining, according to information in the USIM of the mobile user equipment, whether to allow the mobile user equipment to access the CAG cell of the PLMN includes: in case that the USIM has first information associated with an identifier of a home PLMN (HPLMN) indicating that the mobile user equipment is allowed to access the CAG cell of the PLMN, determining that the mobile user equipment is allowed to access the CAG cell of the HPLMN.

In the above technical solution, determining, according to information in the USIM of the mobile user equipment, whether to allow the mobile user equipment to access the CAG cell of the PLMN includes: in case that the USIM has a first identifier associated with a designated PLMN identifier, determining that the mobile user equipment is allowed to access the CAG cell of a PLMN corresponding to the designated PLMN identifier.

In the above technical solution, the method further includes: sending an identifier of a selectable PLMN and a corresponding CAG selection policy to an Access Stratum (AS) function of the mobile user equipment by the NAS function, wherein the CAG selection policy is used for the AS function to select a CAG cell.

In the above technical solution, sending the identifier of the selectable PLMN and the corresponding CAG selection policy to the AS function of the mobile user equipment by the NAS function includes: sending second information to the AS function by the NAS function, the second information indicating that access to all CAG cells of the selectable PLMN is allowed.

In the above technical solution, sending the identifier of the selectable PLMN and the corresponding CAG selection policy to the AS function of the mobile user equipment by the NAS function includes: sending third information to the AS function by the NAS function, the third including information of a CAG cell allowed to access.

In the above technical solution, the CAG cell allowed to access is a CAG cell associated with the selectable PLMN.

A mobile network selection device on a mobile user equipment provided in the embodiments of the present application includes a Non-Access Stratum (NAS) function unit, configured to determine, according to information in a Universal Subscriber Identity Module (USIM) of the mobile user equipment, whether to allow the mobile user equipment to access a Closed Access Group (CAG) cell of a Public Land Mobile Network (PLMN); and select a mobile network corresponding to a PLMN identifier indicated in a broadcast message of a CAG cell when the mobile user equipment receives the broadcast message of the CAG cell and the mobile user equipment is allowed to access the CAG cell of the PLMN.

A mobile user equipment provided in the embodiments of the present application includes a processor and a communication interface, wherein, a Non-Access Stratum (NAS) function of the mobile user equipment executes the following through the processor: determining, according to information in a Universal Subscriber Identity Module (USIM) of the mobile user equipment, whether to allow the mobile user equipment to access a Closed Access Group (CAG) cell of a Public Land Mobile Network (PLMN); and selecting, by the NAS function, a mobile network corresponding to a PLMN identifier indicated in a broadcast message of a CAG cell when the mobile user equipment receives the broadcast message of the CAG cell and the mobile user equipment is allowed to access the CAG cell of the PLMN.

A mobile user equipment provided in the embodiments of the present application includes a processor and a memory configured to store a computer program executable by the processor, wherein the processor is configured to execute the steps of any above method when the computer program is executed by the processor.

A storage medium provided in the embodiments of the present application has stored thereon a computer program, wherein when the computer program is executed by a processor, the processor implements the steps of any above method.

Embodiments of the present application also provide a storage medium having stored thereon a computer program that, when executed by a processor, implements the steps of any of the methods described above.

In the mobile network selection method and the mobile network selection device, the mobile user equipment and the storage medium provided in the embodiments of the present application, when a mobile user equipment supporting a CAG function automatically selects a mobile network, the NAS function of the mobile user equipment determines whether to allow the mobile user equipment to access the CAG cell of the PLMN according to information in the USIM of the mobile user equipment. When the mobile user equipment receives a broadcast message of a CAG cell which indicates that the mobile user equipment is allowed to access the CAG cell of the PLMN, the NAS function can select the mobile network corresponding to the PLMN identifier indicated in the broadcast message of the CAG cell, and can preset, in the USIM, information that can be used to determine whether the terminal is allowed to access the CAG cell of the PLMN, and when it is determined that access to the CAG cell of the PLMN is allowed based on the information, the mobile user equipment tries to access the CAG cell of the designated PLMN, so that when the mobile user equipment supporting the CAG function is in the NPN service area, if the CAG subscription data cannot be obtained from the network side, the CAG cell serving the NPN can be accessed in the NPN service area.

BRIEF DESCRIPTION OF THE DRAWINGS

FIG. 1 is a flowchart of a mobile network selection method according to some embodiments of the present application;

FIG. 2 is a structural schematic diagram of a mobile network selection device according to some embodiments of the present application;

FIG. 3 is a structural schematic diagram of a mobile user equipment according to some embodiments of the present application.

DETAILED DESCRIPTION

The application is described in further detail below with reference to the drawings and embodiments.

When a terminal selects a network, modules for processing a network selection (simply referred to as network selection hereinafter) process on a terminal side includes a NAS function and an AS function, in other words, when the terminal side performs the network selection process, processing at a NAS layer (corresponding a NAS function) and an AS layer (corresponding an AS function). The NAS function processes an interaction flow between the terminal and a core network, and the AS function processes an interaction flow between the terminal and a wireless network.

Here, the network selection refer to selection of a PLMN, including a HPLMN, an equivalent home PLMN (EHPLMN), a visit PLMN (VPLMN), and the like.

A manner of the network selection includes automatic selection and manual selection. The automatic selection means that the NAS function saves a PLMN selection policy, the AS function reads a cell broadcast and reports all available PLMNs to the NAS function, and after receiving this report, the NAS function selects a PLMN according to the PLMN selection policy and instructs the AS function to complete the network selection process. The manual selection means that the AS function reads the cell broadcast, reports to the NAS function all available PLMNs and associated PLMN IDs; the NAS function supports display and manual selection indication; after a user manually selects, the NAS function informs the AS function of the PLMN ID selected by the user, and the AS function completes the network selection process. Here, in both modes, the terminal needs to read the PLMN ID broadcast by each cell of the wireless network, in order to select the PLMN.

The CAG technology in PNI-NPN is mainly used in the network selection stage of the terminal, and is used to prevent the access of non-NPN users or non-home-NPN users.

The main principle of the CAG technology is described below.

It is assumed that a 5G network operator plans two NPNs for two vertical industry customers, i.e., NPN1 and NPN2, respectively. Services of both NPNs are provided through a same PLMN. CAG IDs used for users of the NPN1 network are 1 and 2, and the CAG IDs for users of the NPN2 network are 3 and 4. In a service area of the NPN1, a 5G wireless network will broadcast CAG IDs, which are 1 and 2, permitted to be used by the terminal, and in a service area of the NPN2, the 5G wireless network will broadcast CAG IDs, which are 3 and 4, permitted to be used by the terminal.

In order to provide a service, the 5G network operator writes lists of allowed CAG IDs of NPN1 and NPN2 under a current PLMN into user subscription data of terminals of this NPN (this list of CAG IDs is in CAG information list of a terminal, the CAG information list may be referred to as CAG information or CAG subscription data), and the user subscription data is sent to the terminal by the network side after registration of the terminal. After receiving the CAG subscription data sent by the network side, the terminal stores the CAG subscription data, and performs network selection and cell selection according to the CAG subscription data and a received air-interface broadcast message during the automatic network selection. When a PLMN ID of an entry in the CAG subscription data matches a PLMN ID broadcast by the cell, and a CAG ID in the CAG ID list in the entry matches the CAG ID broadcast by the cell, the PLMN is selected and the terminal resides on the cell. In the automatic network selection, the AS function of a mobile user terminal (may also be referred to as a mobile user equipment) with a CAG capability searches all available cells and reports the PLMN ID broadcast by the cell and associated CAG ID to the NAS function. The NAS function selects a PLMN according to network selection rules (including the CAG subscription data), and if a terminal has multiple allowed CAG IDs under the PLMN, then the NAS function sends a list of CAG IDs to the AS function, and a specific CAG cell under this PLMN is selected by the AS function according to the list of CAG IDs and wireless decision rules (e.g. a signal strength).

As can be seen from the above description, after the introduction of the CAG technology, cells are divided into a CAG cell and a non-CAG cell from the perspective of the wireless side; meanwhile, the network side will broadcast a CAG ID allowed to access under the PLMN.

From the perspective of the core network, the definition of CAG subscription data is added to the subscription data of the user, a NPN user has the CAG subscription data (in mobility restriction subscription data), and a large network user has no CAG subscription data; meanwhile, the subscription data is stored in a Unified Data Management (UDM) function, while a Universal Subscriber Identity Module (USIM) card does not contain the CAG subscription data of a mobile user.

From the perspective of terminals, types of terminals are divided into a terminal that supports CAG characteristics and a terminal that does not support the CAG characteristics; when a terminal selects a network, CAG selection is added (that is, a CAG cell is selected), and includes two ways of automatic selection and manual selection.

In the related art, a basic idea of the CAG automatic selection process is that the terminal selects according to the CAG subscription data.

Specifically, during CAG selection, the AS function searches a network, obtains all available cells according to a cell broadcast, and reports PLMNs of all available cells, whether cells are CAG cells, CAG IDs of CAG cells, etc. to the NAS function. The NAS function selects a PLMN according to the report from the AS and in combination with the CAG subscription data; specifically, if there is the CAG subscription data, the PLMN ID and the CAG ID in the CAG subscription data is matched with the available PLMN IDs and the associated CAG IDs reported by the AS function, and when the CAG ID associated with one PLMN is in a CAG ID list of one PLMN in the CAG subscription data, a CAG cell under this PLMN can be selected; if there is no CAG subscription data, only a non-CAG cell will be selected.

As can be seen from the above description, in the related art, the terminal of a NPN user needs to store the CAG subscription data before accessing a CAG cell of a PLMN serving the NPN when performing the automatic network selection. If the CAG subscription data is not stored in the terminal and the user has never initiated a registration procedure in any PLMN, the CAG subscription data is not stored in the terminal of the user, and thus the terminal cannot automatically access a PLMN from a CAG cell to use a service of a NPN. If only the CAG cells are deployed in the service area of the NPN network, the user cannot reside in any cell in the service area of the NPN.

On the other hand, when an NPN service is provided to a vertical industrial customer in an industrial field, a terminal cannot obtain CAG subscription data before accessing a CAG cell of the NPN service, due to specific requirements of the customer, and therefore, the requirements cannot be met by using a CAG technical scheme in the related art since:

1. A Terminal Cannot be Pre-Configured with CAG Subscription Data

Terminals issued by vertical industry customers in the industrial field are not smart phone terminals issued by traditional operators for individual users, but are large production line devices. The manufacturers of these devices do not know which operator's 5G network service the buyer will use, and even know less about a specific NPN network planning, and thus cannot pre-configure CAG subscription data closely related to network planning on a device (a terminal) for each user. In the related art, processing of pre-configuring the CAG subscription data for the terminal is also not defined.

2. A Terminal Cannot Manually Select the Network and Access the Network to Download the CAG Subscription Data Manual network selection requires a device to perform a manual network selection operation, and the wireless network will broadcast an identification allowing the manual network selection, and once the identification is broadcast, all terminals with CAG capability can manually select a network to access the CAG cell of the NPN network, thus, there is a security risk.

3. A Terminal Cannot Obtain Configuration Through a Non-CAG Cell.

Vertical industry customers in the industrial field need to place the device in the production workshops of a plant area, where only CAG cells are deployed, and ordinary non-CAG cells are not allowed to be deployed.

Based on this, in various embodiments of the present application, information that can be used to determine whether to allow the terminal to access the CAG cell of the PLMN is preset in a USIM card, and when access to the CAG cell of the PLMN is determined to be allowed based on the information, accessing the CAG cell of a designated HPLMN is tried.

An embodiment of the present application provides a mobile network selection method, as shown in FIG. 1, the method includes steps 101 and 102.

Step 101: when a mobile user equipment supporting a CAG function automatically selects a mobile network, determining, by a NAS function of the mobile user equipment, whether to allow the mobile user equipment to access a CAG cell of a PLMN according to information in a USIM of the mobile user equipment.

Step 102: when the mobile user equipment receives a broadcast message of a CAG cell and the mobile user equipment is allowed to access the CAG cell of the PLMN, selecting, by the NAS function, a mobile network corresponding to a PLMN identifier indicated in the broadcast message of the CAG cell.

The mobile user equipment supporting the CAG function refers to a mobile user equipment capable of supporting the CAG technology, and may also be understood as a mobile user equipment supporting the CAG characteristic.

The mobile user equipment may also be referred to as a terminal or user, etc.

In practical application, the solutions provided by the embodiments of the present application can be applied to a vertical industrial scene in an industrial field, in which the mobile user equipment can be a large-scale production line equipment.

In step 101, when the NAS function determines, according to the information in the USIM, that the mobile user equipment is not allowed to access the CAG cell of the PLMN, the NAS function selects the non-CAG cell access.

The information in the USIM is associated with one PLMN, that is, the information in the USIM is information associated with one PLMN.

In actual application, an indication such as CAG access indication (can be express as CAG-access-indication) can be preset in the USIM, the mobile user equipment will check whet a USIM card has this indication when automatically selecting a network; if the USIM card has this indication, the mobile user equipment determines whether a value of the indication is "allowed," and if the value of the indication is 'allowed" (yes), then the mobile user equipment attempts to access the CAG cell of the HPLMN.

Based on this, in an embodiment, determining whether to allow the mobile user equipment to access a CAG cell of a PLMN according to information in a USIM of the mobile user equipment includes: in a case that the USIM has first information indicating that the mobile user equipment is allowed to access the CAG cell of the HPLMN, determining, by the NAS function, whether the mobile user equipment is allowed to access the CAG cell of the PLMN, wherein the first information indicates whether the mobile user equipment is allowed to access the CAG cell of the HPLMN.

When the first information indicates that the mobile user equipment is not allowed to access the CAG cell of the HPLMN, the NAS function determines that the mobile user equipment is not allowed to access the CAG cell of the PLMN. In this condition, the mobile user equipment may access a non-CAG cell.

In other word, there is first information in the USIM, the first information is associated with an identification of the HPLMN, and the first information indicates that the mobile user equipment is allowed to access the CAG cell of the HPLMN, it is determined that the mobile user equipment is allowed to access the CAG cell of the HPLMN. Accordingly, when the first information indicates that the mobile user equipment is not allowed to access the CAG cell of the HPLMN, it is determined that the mobile user equipment is not allowed to access the CAG cell of the HPLMN.

When the first information is not preset in the USIM, the NAS function determines that the mobile user equipment is not allowed to access the CAG cell of the PLMN, and the mobile user equipment can access the non-CAG cell.

In practical application, the first information may be stored in the CAG information in the USIM, that is, the first information may be stored together with the CAG information, the first information and the CAG information may be integrated. Optionally, the first information may not be stored in the CAG information in the USIM, i.e., the first information and the CAG information may be independent pieces of information.

The CAG information refers to the CAG subscription data used by the mobile network operator for subscription of the NPN user, and specific contents of the CAG information can be obtained by referring to Table 1 and Table 2, so the CAG information can be referred to as a CAG information list. After receiving the CAG subscription data sent by the network side, the mobile user equipment stores the CAG subscription data, and performs network selection and cell selection according to the CAG subscription data and the air-interface broadcast message received from the wireless network during the automatic network selection.

Writing first information in the USIM and determining whether the mobile user equipment is allowed to access the cell of the PLMN according to the first information, will not provide a list of allowed CAG IDs associated with a specific NPN planning, and also will not impose restrictions on a USIM card writing procedure of the operator. Meanwhile, the mobile network is not required to broadcast the CAG IDs in the allowed list of CAG IDs written in the USIM, which has no influence on the network planning.

In practical application, an identifier may be preset in the USIM, and the mobile user equipment will check whether the USIM card has the identifier when automatically selecting a network, and if the USIM card has the identifier, then the mobile user equipment may try to access the CAG cell of the designated PLMN corresponding to the identifier.

Based on this, in an embodiment, determining whether to allow the mobile user equipment to access the CAG cell of the PLMN according to the information in the USIM of the mobile user equipment includes: in a case that the USIM has a first identifier and the first identifier is associated with a designated PLMN identifier, determining that the mobile user equipment is allowed to access the CAG cell of a PLMN corresponding to the designated PLMN identifier.

Here, the first identifier may be referred to as a general CAG identifier, in particular, the general CAG identifier is associated with a designated PLMN identifier, and when the USIM has the general CAG identifier, it indicates that the user is allowed to access the CAG cell of the designated PLMN.

In practical application, the first identifier may be stored in CAG information in the USIM, and the general CAG identifier may be a general identifier or a reserved CAG ID. The CAG ID is not used for actual NPN planning, will not be used for subscription of the user, and will not be broadcast by any CAG cell.

The designated PLMN may be an HPLMN.

Writing the first identifier in the USIM and determining whether the mobile user equipment is allowed to access the cell of the PLMN according to the first identifier, will not provide a list of allowed CAG IDs associated with specific NPN planning, and also will not impose restrictions on a USIM card writing procedure of the operator. Meanwhile, the mobile network is not required to broadcast the CAG IDs in the allowed list of CAG IDs written in the USIM, which has no influence on the network planning.

In an embodiment of the present application, when there is no CAG information, matched with the user, on the mobile user equipment, the NAS reads the USIM card to obtain the information.

That is, when there is no CAG information on the mobile user equipment, the NAS function reads the information from the USIM.

When the mobile user equipment has the CAG information, the NAS function performs a network selection operation according to the related art.

It should be noted that an interface between the mobile user equipment and the USIM needs to support reading information from the USIM by the NAS function.

In actual application, the operator can select whether to write the information in the USIM in batches for the NPN user according to NPN deployment requirement, wherein, for the first information, the operator also needs to determine the specific value of the first information according to the requirement.

In actual application, the PLMN identifier may be a PLMN ID. The PLMNs that can be selected may be the HPLMNs corresponding to the SUPI in the USIM.

In actual application, the NAS function delivers a CAG selection policy according to a report of the NS function, so as to access the CAG cell.

Based on this, in an embodiment, the method may further include: sending identifiers of PLMNs that may be selected and a corresponding CAG selection policy to the AS function of the mobile user equipment, wherein the CAG selection policy is used for the AS function to select a CAG cell.

In practical application, when determining the CAG selection policy, only the CAG cell of the HPLMN corresponding to a SUbscription Permanent Identifier (SUPI) in the USIM may be considered, and the specific CAG ID broadcast by the CAG cell may not be considered. That is, the content of the report of the AS function is not considered.

Based on this, in an embodiment, sending the identifiers of the PLMNs that may be selected and the corresponding CAG selection policy to the AS function of the mobile user equipment includes: sending second information to the AS function by the NAS function, the second information indicating that access to all CAG cells of the PLMN that can be selected is allowed, so that the wireless network is not additionally required to broadcast a default CAG ID, there is no need to write a specific CAG ID or a default CAG-ID into the USIM, thereby having no impact on the network planning and the procedure of writing the USIM card.

That is, the NAS function indicates to the AS function that the CAG ID of the CAD cell for which access is allowed is general (can also be understood as All).

Of course, the above two factors can also be used to determine the CAG selection policy, that is, when determining the CAG selection policy, both the CAG cell of the HPLMN corresponding to the SUPI in the USIM and the specific CAG ID broadcast by the CAG cell are considered.

Based on this, in an embodiment, sending the identifiers of the PLMNs that can be selected and the corresponding CAG selection policy to the AS function of the mobile user equipment includes: sending third information to the AS function by the NAS function, wherein the third information indicates CAG cells that are allowed to access, that is, the third information includes information of CAG cells allowed to access, the CAG cell allowed to access is a CAG cell associated with the PLMNs that can be selected, and the CAG cell allowed to access may be a CAG cell associated with the PLMNs that can be selected among available CAG cells reported by the AS function. Since the CAG ID list allowed for access in the CAG selection policy sent by the NAS function to the AS function still includes the specific CAG ID actually broadcast by the network side, there is no need to extend the interface between the NAS function and the AS function.

That is, the NAS function determines which CAG-IDs are associated with the HPLMN of the user according to the available PLMNs and the associated CAG IDs reported by the AS function, and sends, as allowed CAG IDs, the CAG IDs of the HPLMNs to the AS function.

In the mobile network selection method provided in an embodiment of the present application, when a mobile user equipment supporting a CAG function automatically selects a mobile network, the NAS function of the mobile user equipment determines whether to allow the mobile user equipment to access the CAG cell of the PLMN according to information in the USIM of the mobile user equipment. When the mobile user equipment receives a broadcast message of a CAG cell which indicates that the mobile user equipment is allowed to access the CAG cell of the PLMN, the NAS function can select the mobile network corresponding to the PLMN identifier indicated in the broadcast message of the CAG cell, and can preset, in the USIM, information that can be used to determine whether the terminal is allowed to access the CAG cell of the PLMN, and when it is determined that access to the CAG cell of the PLMN is allowed based on the information, the mobile user equipment tries to access to the CAG cell of the designated PLMN, so that when the mobile user equipment supporting the CAG function is in the NPN service area, if the CAG subscription data cannot be obtained from the network side, the CAG cell serving the NPN can be accessed in the NPN service area.

The application is described in further detail below in connection with an application example.

In this application example, a CAG access indication is preset in the USIM, and may take values of "allowed" and "not allowed" respectively. This indication is an optional message. The operator may select whether to write this indication in the USIMs for the NPN users in batch according to NPN deployment requirements, and determine the value of this indication.

In this application example, when automatically selecting a network, the terminal first checks whether CAG subscription data is saved, and if the CAG subscription data is not saved, the terminal further checks whether the USIM has a CAG access indication. When there is a CAG access indication and the value is "allowed", the terminal may attempt to access the CAG cell of the HPLMN corresponding to the SUPI in the USIM card, but will not attempt to access the CAG cells of other PLMNs. When the terminal automatically selects the network, if the terminal stores the CAG subscription data, the terminal selects the network according to the related art.

Assuming that the terminal has no CAG information list, that is, no CAG subscription data, the USIM in the terminal writes the CAG access indication which takes the value of 'allowed'.

The step of selecting the network by the terminal in this application example includes the following steps 1-4.

Step 1: the terminal enters the automatic network selection mode, the AS function searches all available network cells, reads cell broadcast information, and reports all available PLMN IDs, cells and associated CAG IDs to the NAS function.

It is assumed that contents of the report include:
PLMN-1/cell-1/CAG ID=1;
PLMN-1/cell-2/CAG ID=2;
PLMN-1/cell-3/CAG ID=3;
PLMN-2/cell-1/CAG ID=1;
PLMN-2/cell-2/CAG ID=null;
PLMN-3/cell-1/CAG ID=7;
PLMN-4/cell-1/CAG ID=11.

The null indicates that there is no broadcast CAG ID, that is, the cell is a non-CAG cell.

Step 2: after receiving the report from the AS function, the NAS function checks that the CAG information list of the user is not saved, so the NAS function reads the information in the USIM.

Step 3: The NAS function reads CAG-access-indication=allowed in USIM, and reads HPLMN as PLMN-1. The CAG cells belonging to the HPLMN among all available cells in the report are judged, and the CAG selection policy is delivered to the AS function.

The NAS function delivers the CAG selection policy to the AS function in two ways:

The first way: the NAS function indicates to the AS function that the CAG ID allowed for access is general/ALL, that is, second information is delivered. Specific policy format may be that PLMN-1, CAG ID=ALL is selected.

Second way: the NAS function determines which CAG-IDs are associated with the HPLMN of the user according to the available PLMNs and the associated CAG IDs reported by the AS function, sends the CAG IDs of the HPLMN as allowed CAG IDs to the AS function, that is, sends third information. When the reported available PLMN has HPLMN, HPLMN ID=PLMN-1, and has 3 associated CAG IDs, CAG-ID=1, 2, 3, the policy format may specifically be that PLMN-1 is selected and CAG ID=1, 2, 3 is allowed.

Step 4: the AS function performs cell selection according to the delivered CAG selection policy (may also be referred to as selection policy).

Specifically, when the CAG selection policy delivered in the first manner is adopted, since the CAG ID is ALL, the AS selects from all CAG cells of the HPLMN according to other cell selection principles. If a CAG cell with a strongest signal is selected, that is, PLMN-1/cell-3/CAG ID=3.

When the CAG selection policy delivered in the second manner is adopted, since all CAG cells with CAG ID=1, 2, 3 are allowed to access, the AS selects from the CAG cells with CAG ID=1, 2, 3 according to other cell selection principles, such as selecting the CAG cell with the strongest signal, that is. PLMN-1/cell-3/CAG ID=3.

As can be seen from the above description, with the embodiments of the present application, when the terminal supporting the CAG function is in the NPN service area, manual network selection is unnecessary, automatic access to the CAG cell in the NPN service area can be realized without deploying a non-CAG cell in the NPN service area or transferring the equipment to a large network CAG cell to obtain the CAG subscription data from the network.

In order to implement the method of the embodiment of the present application, the embodiment of the present application also provides a mobile network selection device, which is arranged on a mobile user equipment, and as shown in FIG. 2, the device includes:

a NAS function unit 201, configured to determine whether to allow the mobile user equipment to access a CAG cell of a PLMN according to information in a USIM of the mobile user equipment, and when the mobile user equipment receives a broadcast message of a CAG cell and the mobile user equipment is allowed to access the CAG cell of the PLMN, select a mobile network corresponding to a PLMN identifier indicated in the broadcast message of the CAG cell.

In the embodiment, the NAS functional unit 201 is further configured to: read the information from the USIM when there is no CAG information on the mobile user equipment.

In the embodiment, the NAS function unit 201 is further configured to: in a case that the USIM has first information associated with a HPLMN identifier and indicating that the mobile user equipment is allowed to access the CAG cell of the HPLMN, determining that the mobile user equipment is allowed to access the CAG cell of the HPLMN.

In the embodiment, the NAS function unit 201 is configured to: in a case that the USIM has a first identifier and the first identifier is associated with a designated PLMN identifier, determine that access to the CAG cell of the PLMN by mobile user equipment is allowed, wherein the PLMN is a PLMN corresponding to the designated PLMN identifier.

In the embodiment, as shown in FIG. 2, the device may further include an AS function unit 202.

The NAS function unit 201 is further configured to send identifiers of PLMNs that can be selected and a corresponding CAG selection policy to the AS function unit 202, wherein the CAG selection policy is used by the AS function unit 202 to select a CAG cell.

The AS function unit 202 is further configured to receive the identifiers of the PLMNs that can be selected and the corresponding CAG selection policy, and select a CAG cell using the CAG selection policy.

In the embodiment, the NAS function unit 201 is configured to: send, to the AS function unit 202, second information indicating that access to all CAG cells of the PLMNs that can be selected is allowed.

The AS function unit 202 is configured to receive the second information and select a CAG cell using the second information.

In the embodiment, the NAS function unit 201 is configured to: send third information to the AS function, the third information including information of CAG cells allowed for access.

The AS function unit 202 is configured to receive the third information and select a CAG cell using the third information.

In practical application, the NAS function unit 201 and the AS function unit 202 may be implemented by one or more processors in the mobile network selection device.

It should be noted that when the mobile network selection device provided in the above embodiment performs mobile network selection, exemplified illustration is given by only the program modules, and in actual application, the above processing may be implemented by different program modules as needed, i.e., an internal structure of an apparatus is divided into different program modules to complete all or part of the processing described above. In addition, the mobile network selection device provided in the above embodiments belongs to the same concept as the embodiment of the mobile network selection method, and the specific implementation process thereof is described in details in the method embodiment, which is not repeated here.

Based on hardware implementation of the above program modules, and in order to implement the method of the embodiment of the present application, the embodiment of the present application also provides a mobile user equipment, as shown in FIG. 3, the mobile user equipment 300 includes:

a communication interface 301 capable of performing information interaction with a network device;

a processor 302 connected with the communication interface 301 to perform information interaction with a network device, and configured to execute the method provided by one or more technical solutions at the mobile user equipment side when running a computer program. The computer program is stored on a memory 303.

In particular, the NAS function of the mobile user equipment 300 performs following by using a processor 302:

determining whether to allow the mobile user equipment to access a CAG cell of a PLMN according to information in a USIM of the mobile user equipment, and when the mobile user equipment receives a broadcast message of a CAG cell and the mobile user equipment is allowed to access the CAG cell of the PLMN, selecting, by the NAS function, a mobile network corresponding to a PLMN identifier indicated in the broadcast message of the CAG cell.

In the embodiment, the NAS function further implements following by using the processor 302:

reading the information from the USIM when there is no CAG information on the mobile user equipment.

In the embodiment, the NAS function further implements following by using the processor 302:

in a case that the USIM has first information associated with a HPLMN identifier and indicating that the mobile user equipment is allowed to access the CAG cell of the HPLMN, determining that the mobile user equipment is allowed to access the CAG cell of the HPLMN.

In the embodiment, the NAS function further implements following by using the processor 302:

in a case that the USIM has a first identifier and the first identifier is associated with a designated PLMN identifier, determining that access to the CAG cell of the PLMN by the mobile user equipment is allowed, wherein the PLMN is a PLMN corresponding to the designated PLMN identifier.

In the embodiment, the NAS function further implements following by using the processor 302:

sending identifiers of PLMNs that can be selected and a corresponding CAG selection policy to the AS function of the mobile user equipment, wherein the CAG selection policy is used by the AS function to select a CAG cell.

In the embodiment, the NAS function further implements following by using the processor 302:

sending, to the AS function, second information indicating that access to all CAG cells of the PLMNs that can be selected is allowed.

In the embodiment, the NAS function further implements following by using the processor 302:

sending third information to the AS function, the third information including information of CAG cells allowed for access.

It should be noted that the specific processing procedures of the processor 302 and the communication interface 301 can be understood with reference to the above method.

Of course, in practice, various components in the mobile user equipment 300 are coupled together by a bus system 304. It will be appreciated that the bus system 304 is configured to enable connection communication between these components. The bus system 304 includes, in addition to a data bus, a power bus, a control bus, and a status signal bus. However, for clarity of illustration, various bus are labeled the bus system 304 in FIG. 3.

The memory 303 in embodiments of the present application is configured to store various types of data to support operation of the mobile user equipment 300. Examples of such data include any computer program for operating on the mobile user equipment 300.

The method disclosed in the embodiments of the present application may be applied in or implemented by the processor 302. The processor 302 may be an integrated circuit chip with signal processing capability. In an implementation, the steps of the method described above may be performed by integrated logic circuitry of hardware in the processor 302 or instructions in the form of software. The processor 302 may be a general purpose processor, a Digital Signal Processor (DSP), or other programmable logic devices, discrete gates or transistor logic devices, discrete hardware component, etc. The processor 302 may implement or execute the methods, steps, and logic blocks disclosed in embodiments of the present application. The general purpose processor may be a microprocessor or any conventional processor or the like. The steps of the method disclosed in connection with the embodiments of the present application may be directly performed by a hardware decoding processor or performed by a combination of hardware and software modules in the decoding processor. The software modules may be located in a storage medium located in the memory 303, and the processor 302 reads the information in the memory 303 and performs the steps of the foregoing method in conjunction with its hardware.

It is understood that the memory 303 of the embodiment of the present application may be a volatile memory or a non-volatile memory, or may include both volatile and non-volatile memories. The non-volatile memory may be a read only memory (ROM, Read Only Memory), a programmable read only memory (PROM, Programmable Read-Only Memory), an erasable programmable read only memory (EPROM, Erasable Programmable Read-Only Memory), an electrically erasable programmable read-only Memory (EEPROM, Electrically Erasable Programmable Read-Only Memory), a ferromagnetic random access memory (FRAM), a Flash Memory (Flash Memory), a magnetic surface memory, an optical disc, or a read-only optical disc (CD-ROM, Compact Disc Read-Only Memory); the magnetic surface memory may be a magnetic disk memory or a magnetic tape memory. The volatile memory may be a random access memory (RAM, Random Access Memory), which is used as an external cache. By way of example and not limitation, many forms of RAMs are available, such as a Static Random Access Memory (SRAM), a Synchronous Static Random Access Memory (SSRAM), a Synchronous Static Random Access Memory, a Dynamic Random Access Memory (DRAM), a Synchronous Dynamic Random Access Memory (SDRAM), a Double Data Rate Synchronous Dynamic Random Access Memory (DDRSDRM), an Enhanced Synchronous Dynamic Random Access Memory (ESDRAM), a SyncLink Dynamic Random Access Memory (SLDRAM), a Direct Rambus Random Access Memory (DRRAM). The memory described in embodiments of the present application is intended to include, but is not limited to, these and any other suitable types of memory.

Embodiments of the present application also provide a storage medium, i.e. a computer storage medium, in particular, a computer-readable storage medium, for example, a memory 303 storing a computer program. The computer program may be executed by the processor 302 of the mobile user equipment 300 to perform the steps of the foregoing method. The computer readable storage medium may be a memory such as FRAM, ROM, PROM, EPROM, EEPROM, Flash Memory, a magnetic surface memory, an optical disk, or CD-ROM.

It should be noted that "first," "second," and the like are used to distinguish similar objects and need not be used to describe a particular order or sequence.

In addition, the technical solutions described in the embodiments of the present application may be arbitrarily combined without conflict.

The above description is only preferred embodiments of the present application and is not intended to limit the protection scope of the present application.

What is claimed is:

1. A mobile network selection method, comprising:

when a mobile user equipment supporting a Closed Access Group (CAG) function automatically selects a mobile network, determining, by a Non-Access Stratum (NAS) function of the mobile user equipment according to information in a Universal Subscriber Identity Module (USIM) of the mobile user equipment, whether to allow the mobile user equipment to access a CAG cell of a Public Land Mobile Network (PLMN);

when the mobile user equipment receives a broadcast message of a CAG cell and the mobile user equipment is allowed to access the CAG cell of the PLMN, selecting, by the NAS function, a mobile network corresponding to a PLMN identifier indicated in the broadcast message of the CAG cell; and sending an identifier of a selectable PLMN and a corresponding CAG selection policy to an Access Stratum (AS) function of the mobile user equipment by the NAS function, wherein the CAG selection policy is used for the AS function to select a CAG cell, wherein sending the identifier of the selectable PLMN and the corresponding CAG selection policy to the AS function of the mobile user equipment by the NAS function comprises:

sending third information to the AS function by the NAS function, the third comprising information of a CAG cell allowed to access.

2. The method according to claim 1, further comprising: reading the information from the USIM by the NAS function when there is no CAG information on the mobile user equipment.

3. The method according to claim 1, wherein the CAG cell allowed to access is a CAG cell associated with the selectable PLMN.

4. A non-transitory computer readable storage medium having stored thereon a computer program, wherein when the computer program is executed by a processor, the processor implements the steps of the method according to claim 1.

5. The method according to claim 1, wherein determining, according to information in the USIM of the mobile user equipment, whether to allow the mobile user equipment to access the CAG cell of the PLMN comprises:

in case that the USIM has first information associated with an identifier of a home PLMN (HPLMN) indicating that the mobile user equipment is allowed to access the CAG cell of the PLMN, determining that the mobile user equipment is allowed to access the CAG cell of the HPLMN.

6. The method according to claim 1, wherein determining, according to information in the USIM of the mobile user equipment, whether to allow the mobile user equipment to access the CAG cell of the PLMN comprises:

in case that the USIM has a first identifier associated with a designated PLMN identifier, determining that the mobile user equipment is allowed to access the CAG cell of a PLMN corresponding to the designated PLMN identifier.

7. A mobile user equipment, comprising a processor and a memory configured to store a computer program executable by the processor, wherein the processor is configured to execute the steps of the method according to claim 1 when the computer program is executed by the processor.

8. The mobile user equipment according to claim 7, wherein when the computer program is executed by the processor, the processor is further configured to execute following:

reading the information from the USIM by the NAS function when there is no CAG information on the mobile user equipment.

9. The mobile user equipment according to claim 7, wherein the CAG cell allowed to access is a CAG cell associated with the selectable PLMN.

10. The mobile user equipment according to claim 7, wherein determining, according to information in the USIM of the mobile user equipment, whether to allow the mobile user equipment to access the CAG cell of the PLMN comprises:

in case that the USIM has first information associated with an identifier of a home PLMN (HPLMN) indicating that the mobile user equipment is allowed to access the CAG cell of the PLMN, determining that the mobile user equipment is allowed to access the CAG cell of the HPLMN.

11. The mobile user equipment according to claim 7, wherein determining, according to information in the USIM of the mobile user equipment, whether to allow the mobile user equipment to access the CAG cell of the PLMN comprises:

in case that the USIM has a first identifier associated with a designated PLMN identifier, determining that the mobile user equipment is allowed to access the CAG cell of a PLMN corresponding to the designated PLMN identifier.

12. A mobile user equipment, comprising a processor and a communication interface, wherein, a Non-Access Stratum (NAS) function of the mobile user equipment executes the following through the processor:

determining, according to information in a Universal Subscriber Identity Module (USIM) of the mobile user equipment, whether to allow the mobile user equipment to access a Closed Access Group (CAG) cell of a Public Land Mobile Network (PLMN); and selecting, by the NAS function, a mobile network corresponding to a PLMN identifier indicated in a broadcast message of a CAG cell when the mobile user equipment receives the broadcast message of the CAG cell and the mobile user equipment is allowed to access the CAG cell of the PLMN; and sending an identifier of a selectable PLMN and a corresponding CAG selection policy to an Access Stratum (AS) function of the mobile user equipment by the NAS function, wherein the CAG selection policy is used for the AS function to select a CAG cell, wherein sending the identifier of the selectable PLMN and the corresponding CAG selection policy to the AS function of the mobile user equipment by the NAS function comprises:

sending third information to the AS function by the NAS function, the third comprising information of a CAG cell allowed to access.

13. The mobile user equipment according to claim 12, wherein the NAS function of the mobile user equipment further executes the following through the processor:

reading the information from the USIM by the NAS function when there is no CAG information on the mobile user equipment.

14. The mobile user equipment according to claim 12, wherein determining, according to information in the USIM of the mobile user equipment, whether to allow the mobile user equipment to access the CAG cell of the PLMN comprises:

in case that the USIM has first information associated with an identifier of a home PLMN (HPLMN) indicating that the mobile user equipment is allowed to access the CAG cell of the PLMN, determining that the mobile user equipment is allowed to access the CAG cell of the HPLMN.

15. The mobile user equipment according to claim 12, wherein determining, according to information in the USIM of the mobile user equipment, whether to allow the mobile user equipment to access the CAG cell of the PLMN comprises:

in case that the USIM has a first identifier associated with a designated PLMN identifier, determining that the mobile user equipment is allowed to access the CAG cell of a PLMN corresponding to the designated PLMN identifier.

* * * * *